HORIZONTAL DEFLECTION CIRCUIT

Filed Nov. 29, 1967 2 Sheets-Sheet 1

INVENTORS.
WILLIAM GELLER
KURT HILLMAN
BY Joseph H. Rediger
ATTORNEY.

INVENTORS.
WILLIAM GELLER
KURT HILLMAN
BY Joseph H. Roediger
ATTORNEY.

United States Patent Office 3,466,496
Patented Sept. 9, 1969

3,466,496
HORIZONTAL DEFLECTION CIRCUIT

William Geller, Plainview, and Kurt Hillman, Flushing, N.Y., assignors to General Telephone & Electronics Laboratories Incorporated, a corporation of Delaware
Filed Nov. 29, 1967, Ser. No. 686,669
Int. Cl. H01j 29/70
U.S. Cl. 315—27 11 Claims

ABSTRACT OF THE DISCLOSURE

A horizontal deflection circuit for a television receiver is disclosed wherein a single drive stage provides both the turn-on and turn-off drive signals for the output stage containing the deflection coil. The drive stage of the deflection circuit, which contains a transistor, an inductor, a flyback capacitor and damping means, generates a sawtooth turn-on drive signal for the output stage transistor. The turn-off drive signal for the output stage transistor is provided by damping the oscillation between the inductor and the flyback capacitor in the drive stage so that current having a polarity opposite to the turn-on drive signal is supplied to the output stage.

BACKGROUND OF THE INVENTION

This invention relates to solid-state horizontal deflection circuits for cathode ray tube scanning.

The horizontal scan signal in a television receiver is a substantially sawtooth current waveform and generates the horizontal deflection field for the electron beam in the cathode ray tube. The horizontal scan signal is standardized in the United States at the 15.75 kh. rate. This signal rate is substantially greater than that of the vertical sawtooth signal and for equal energy dissipation per cycle in the respective deflection circuits, over 200 times as much energy must be supplied to the horizontal deflection coils as is supplied to the vertical deflection coils. Thus, power economy or efficiency is of primary importance in the horizontal deflection circuit.

The high power requirements of the horizontal deflection circuit have heretofore favored the continued use of vacuum tube circuitry in television receivers. However, the recent development of high power solid state components having the ability to be rapidly switch from conduction to nonconduction, for example silicon controlled rectifiers, gate controlled switches, high power transistors and the like, has generated increasing interest in solid state deflection circuits. One type of solid state deflection circuit utilizes a high power transistor which is transformer coupled to the drive circuit. The drive signal applied to the base electrode of the transistor is essentially a square wave which decreases in magnitude in accordance with the transformer time constant so that the smallest amount of drive is supplied at the time that the transistor is conducting its peak current. Consequently, the minimum drive signal amplitude occurs at the time that the transistor is conducting its maximum current. In order to insure that the transistor is maintained in saturation substantially throughout its dynamic range, it is therefore necessary to provide considerable excess drive when the transistor is conducting a relatively small current. As a result, the efficiency of this type of circuit is degraded. In addition, the magnetizing current in the transformer at the completion of the turn-on drive current is not utilized by the circuit and, thus, the efficiency of the circuit is further reduced.

The efficiency of solid state deflection circuits is greatly improved by the use of separate turn-on and turn-off drive circuits for the semiconductor switching element. The separate drive circuits generate the substantially different waveforms for the turn-on and turn-off signals necessary to obtain efficient and rapid switching of the horizontal scan rate. Two examples of deflection circuits utilizing semiconductor switching elements are disclosed in copending U.S. patent application Ser. Nos. 591,161 and 595,227 filed Nov. 1, 1966 and Nov. 17, 1966 respectively, and assigned to the same assignee as is the instant application.

In the case of horizontal deflection circuits employing a high power transistor as the semiconductor switching element, a substantial improvement in efficiency is obtained by utilizing a turn-on drive circuit which provides a sawtooth waveform turn-on signal. Since the turn-on signal is required to keep the transistor in saturation during the appropriate portion of the scan interval, the peak magnitude of the drive signal occurs at the time when the transistor is conducting its peak current, which may be as high as 8 amperes, and exhibits its lowest gain. By utilizing a sawtooth turn-on signal, the circuit efficiency is improved since the transistor is not heavily saturated at low current levels and, therefore, dissipation therein is reduced.

Since the semiconductor switching element is switched from a highly conductive state wherein it is conducting several amperes to a nonconductive state in a retrace period of the order of microseconds, the turn-off signal must rapidly remove or sweep out the stored carriers. The failure to swiftly remove these stored carriers results in the element being partially conductive for a significant interval during which time substantial dissipation takes place. To prevent this potential degrading of the circuit efficiency, the turn-off drive circuit is required to provide a turn-off signal having a magnitude that is typically of the order of several amperes. The use of a silicon controlled rectifier in the turn-off drive circuit has been found to provide the required reverse current.

While the use of separate turn-on and turn-off drive circuits provides efficient operation of solid state horizontal deflection circuits, the need to utilize separate semiconductor elements in the drive circuits substantially increases the cost of the deflection circuit. Consequently, considerable interest exists in the development of relatively inexpensive and efficient solid state circuitry for television receivers. The present invention is directed to a solid state horizontal deflection circuit which is both efficient and at the same time employs a single transistor in the drive stage to provide the turn-on and turn-off drive signals to the output stage.

SUMMARY OF THE INVENTION

The horizontal deflection circuit described herein contains a single driving stage which provides both the turn-on and turn-off drive signals for the output stage of the deflection circuit.

The deflection circuit comprises an output stage which is coupled to the horizontal deflection coil of a television receiver and generates the 15.75 kh. sawtooth waveform deflection current therein and a driving stage which provides the turn-on and turn-off driving signals for the output stage switching element, typically a transistor, in accordance with an applied timing signal.

The output stage of the deflection circuit includes a first semiconductor switching element having first, second, and third electrodes. This element controls the reactive power needed for the horizontal deflection coil and passes current flowing from its first to third electrodes when a first polarity signal is applied to the second electrode and is rendered nonconductive by the application of a second polarity signal to the second electrode. The first electrode of the switching element is coupled to one terminal of a supply voltage source. The second terminal of the voltage source is coupled to a reference potential. The third electrode of the semiconductor switching element is coupled to the first terminal of the deflection coil. In addition, the third electrode is coupled to the first terminal of a flyback capacitor and to the first electrode of a damping diode. The second terminals of the flyback capacitor and the deflection coil are coupled to a reference potential, i.e. ground. Further, the second electrode of the damping diode is coupled to the first electrode of the switching element. This damping diode is poled to pass current flowing from its first to second electrodes. As a result, the voltage level at the third electrode of the switching element is prevented from substantially exceeding the supply voltage level when the first semiconductor switching element is turned-off.

During operation, the sawtooth waveform deflection current is caused to flow in the deflection coil by alternately driving the first switching element into and out of conduction. When the first element is rendered conductive, i.e. turned on, the supply voltage is applied across the deflection coil and the current therein increases in a linear manner. At the end of the scan interval, the element is turned-off whereby a low impedance connection betwen the first terminal of the coil and the supply voltage source is no longer provided and the current in the coil reverses in a resonant manner. The current reversal occurs during the scan retrace interval with the time required for the reversal being a function of the inductance of the coil and the capacitance of the flyback capacitor. At the completion of the retrace interval, the current in the coil is reversed and the damping diode begins to conduct since the flyback voltage tends to become greater than the voltage level at the source. The current from the coil flows through the damper diode until it again changes its polarity. By turning on the first switching element at or prior to the time when the current reverses, the current flows therethrough during the remaining portion of the scan interval.

The first switching element is turned on and off by the drive circuit which operates as an auxiliary sawtooth generator to provide efficient turn-on and rapid turn-off drive signals. The first switching element, when conductive, conducts a current which is increasing in a linear manner. For efficient operation, the first element is required to be driven into its saturated or fully conductive state during the interval that it is conductive. The element is turned-off when it is conducting the maximum amount of current. This turn-off must be rapidly effected and, therefore, a large turn-off drive current is needed to sweep out stored carriers contained therein.

The required efficient and rapid switching is provided by the single drive circuit of the present invention which comprises means for applying a sawtooth drive signal to the second electrode of the first element. The sawtooth drive signal is characterized by having an initial magnitude at the second polarity and a final magnitude at the first polarity so that the first element is driven alternately into and out of conduction. The initial and final magnitudes of the drive signal are substantially equal although of opposite polarity. The means for applying this drive signal to the first element includes a second semiconductor switching element, typically a transistor, having first, second and third electrodes. The switching element passes current from its first to third electrodes when a first polarity signal is applied to the second electrode and is rendered nonconductive by the application of a second polarity signal to the second electrode.

The first electrode of the second switching element is coupled to the second electrode of the first switching element so that rendering the second element conductive results in the first element being turned-on. The third electrode of the second element is coupled to the first terminal of an inductive means. The second terminal of the inductive means is coupled to the reference potential. Consequently, a first polarity signal applied to the second electrode of the second element renders both the first and second elements conductive and results in the application of a voltage across the inductive means. This causes a sawtooth waveform current to be supplied to the second electrode of the first switching element. The instantaneous magnitude of this sawtooth turn-on drive signal is chosen so that the first element is maintained in saturation over its dynamic current range.

A flyback capacitor is included in the drive circuit with the first terminal thereof being coupled to the first terminal of the inductive means and the second terminal thereof being coupled to the reference potential. Therefore, the application of a second polarity signal to the second semiconductor element turns this element off and results in a resonant reversal of the current in the inductive means. The time required for this resonant reversal of the current is a function of the inductance of the inductive means and the capacitance of this flyback capacitor.

When the second element is turned-off, the drive signal is no longer applied to the first element. However, the first element continues to conduct due to the storage of minority carriers therein during the time required for the current reversal in the drive circuit. When the current in the drive circuit is reversed, this current becomes the turn-off drive signal for the first element and rapidly sweeps out the stored carriers therein to render the element nonconductive.

The second switching element is rendered conductive and nonconductive by the application of a timing signal to the second electrode thereof. Accordingly, means for applying the timing signal is coupled between the first and second electrodes of the second element. In practice, the means may comprise the secondary winding of a transformer with the primary thereof being coupled to a sine wave oscillator. The means for applying the timing signal can be utilized to provide the conductive path for the turn-off drive signal with the reverse current flowing therethrough when the second element is nonconductive. However if the oscillator stability should be affected by the presence of this current in the transformer winding, a damping diode can be coupled between the first and third electrodes of the second element to conduct the reverse current and apply the turn-off drive to the second electrode of the first element.

The drive circuit in the present horizontal deflection circuit provides both an efficient turn-on and a rapid turn-off drive signal for the output stage with a relatively few components. Further features and advantages of the invention will become more readily apparent from the following detailed description of a specific embodiment taken in conjunction with the accompanying drawings.

DETAILED DESCRIPTION OF THE PREFERRED EMBODIMENT

Figure 1:
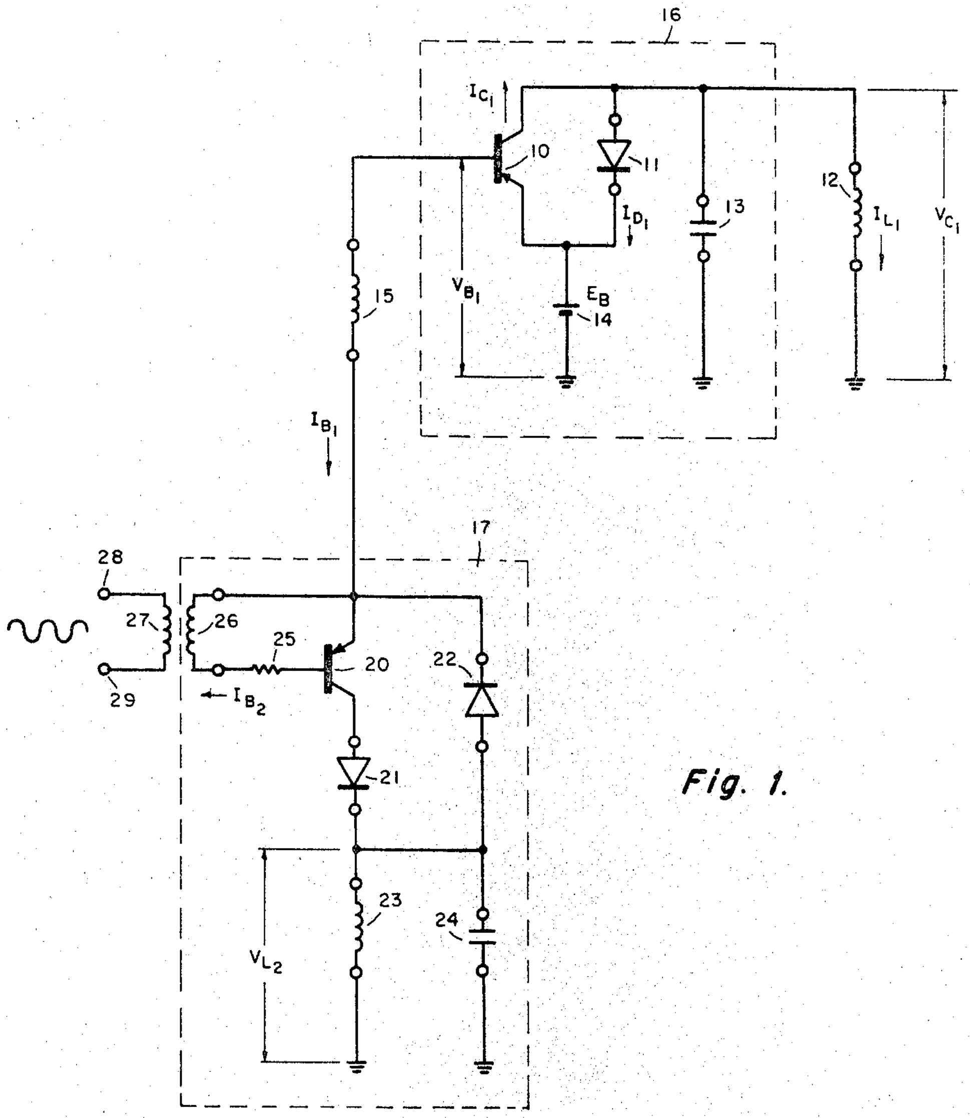
FIG. 1 is an electrical schematic diagram of one embodiment of the invention.
Figure 2:
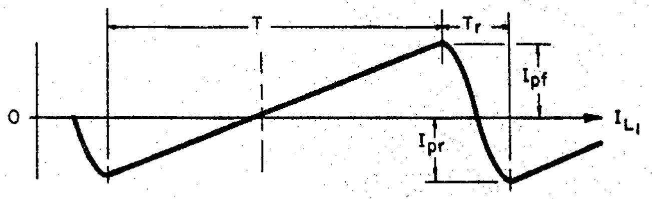
FIGS. 2–9 show current and voltage waveforms occurring at different points in the embodiment of FIG. 1.

Referring now to FIG. 1, a horizontal deflection circuit for a television receiver is shown comprising an output stage 16 and a drive stage 17. The output stage 16 is coupled to deflection coil 12 and generates the conventional sawtooth waveform scan current therein. The waveform of this current is shown in FIG. 2 and is designated in FIG. 1 as $I_{L1}$. In the United States, the rate at which this waveform occurs is standardized at 15.75 kh.

The sawtooth current $L_{L1}$ of FIG. 2 is characterized by having amplitudes $I_{PR}$ and $I_{PF}$ at the start and at the completion of trace interval T, respectively. Upon the completion of the trace interval T, the current $I_{L1}$ undergoes a polarity reversal during the retrace interval $T_R$ and its magnitude is $I_{PR}$ at the start of the following trace interval. Returning to the output stage 16 of FIG. 1, the completion of the trace interval T and the start of the retrace interval $T_R$ are controlled by semiconductor switching element 10. This element, typically a transistor, is shown having its emitter electrode coupled to supply voltage source 14 and its collector electrode coupled to the first terminal of deflection coil 12. The base electrode of transistor 10 is coupled to the drive stage 17 which renders transistor 10 conductive and nonconductive in accordance with a timing signal applied thereto.

Figures 5, 6, 7, 8, 9:
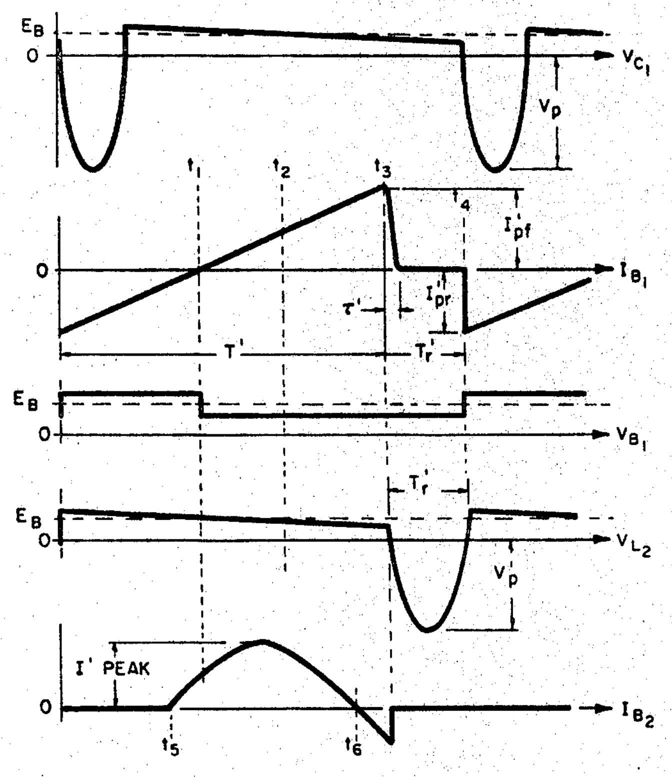

When transistor 10 is driven into conduction, the supply voltage of source 14 is applied across deflection coil 12 and the current therein increases in a linear manner toward the magnitude $I_{PF}$. At the completion of the trace interval T, the transistor 10 is rendered nonconductive by the drive stage 17 and the low impedance connection with the supply voltage source 14 is no longer provided. As a result, the current $I_{L1}$ in deflection coil 12 is reversed in a resonant manner to a value of $I_{PR}$. The time required for the resonant reversal of the current is a function of the product of the inductance of the deflection coil and the capacitance of flyback capacitor 13. The magnitude of these components is selected so that the resonant reversal occurs within the retrace interval $T_R$. At the end of the retrace interval, the current in the deflection coil 12 has reached a value of $I_{PR}$ and the damping diode 11 is driven into conduction since the voltage at the collector electrode of the diode tries to become more positive than the supply voltage. The waveform of the collector voltage is shown in FIG. 5. During this portion of the trace interval T, the transistor 10 is nonconductive and the current $I_{D1}$ flows through damping diode 11. When the direction of the deflection coil current $I_L$ reverses, transistor 10 is rendered conductive and takes over from the damping diode.

Figure 3:
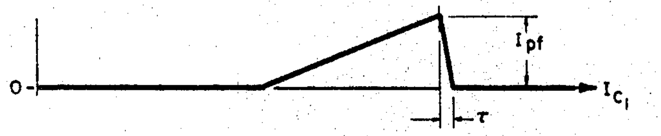
Figure 4:
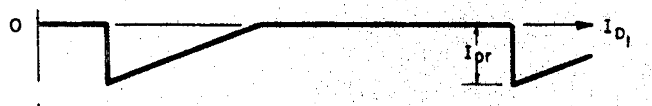

The operation of the output stage 16 is illustrated in FIGS. 2–5 wherein FIG. 2 shows the waveform of the deflection coil current $I_{L1}$. The waveform of FIG. 3 shows the collector current $I_{C1}$ of transistor 10, while FIG. 4 shows the damping diode current $I_{D1}$. The sum of the currents shown in FIG. 3 and 4 is essentially equal to the deflection coil current $I_{L1}$ of FIG. 2. The voltage appearing at the collector of transistor 10 and the first terminal of the deflection coil is shown in FIG. 5 wherein it will be noted that this voltage tends to exceed the magnitude $E_B$ of the supply voltage source 14 at the end of the retrace interval $T_R$. However, the damping diode 11 begins to conduct at this point and clamps the voltage level to essentially $E_B$. Assuming that there are no losses in the circuit components, and that transistor 10 is instantaneously rendered nonconductive, the net current from the voltage source 14 is essentially zero and the current $I_{PF}$ equals the current $I_{PR}$. In other words, current is taken from the voltage supply when transistor 10 is conductive and returned to the voltage supply when the damping diode is conductive.

In practice, the circuit is not lossless. The primary source of power dissipation arises from the fact that transistor 10 has a finite switching speed and cannot be instantaneously rendered nonconductive. As shown in FIG. 3, a switching time $\tau$ is observed when the element is rendered nonconductive. The effect of this finite switching time is to dissipate energy stored in the deflection coil such that $I_{PR}$ is less than $I_{PF}$. By minimizing this switching time $\tau$, the efficiency of the circuit is enhanced. The inability to rapidly turn off the transistor by merely removing the turn-on drive signal is due primarily to the storage of minority carriers therein. This problem is especially severe in the horizontal deflection circuit of a television receiver wherein the transistor is conducting most heavily at the instant at which it is to be turned off.

Consequently, the reverse or turnoff drive signal is applied to the base electrode of the transistor in order to rapidly sweep out the stored carriers. The greater the reverse drive applied, the smaller or shorter the switching time $\tau$ becomes. In addition, to reducing the switching time, the turn-off drive decreases the storage time of the transistor. The storage time is the length of time, before the collector current begins to decrease, that the transistor says in saturation upon the application of the turn-off drive.

During the portion of the trace interval T in which the transistor is conducting, the transistor is utilized to provide a low resistance connection between the supply voltage source 14 and the coil 12. To minimize the resistance of this connection, the turn-on drive signal supplied to the base of transistor 10 maintains the transistor in saturation throughout the dynamic range. Since the collector current of the transistor varies essentially linearly from 0 to $I_{PF}$, the turn-on drive signal is a sawtooth waveform and is shown in FIG. 6. The turn-on drive signal becomes positive at time $t_1$ in FIG. 6 which is prior to the time $t_2$ when the current through the coil becomes positive. This improves the linearity of the waveform of the current $I_{L1}$ during the trace interval and the circuit efficiency since transistor 10 is conductive at the time the damping diode 11 stops conducting.

When transistor 10 is conducting the maximum current $I_{PF}$, it is necessary for efficient operation to rapidly turn the transistor off. Since the transistor is in saturation and is conducting a substantial current, a considerable quantity of minority carriers are stored therein. These carriers are to be removed before the transistor can be turned off. Minority carrier removal is effected by applying a turn-off drive signal to the base electrode of transistor 10 at the end of the trace interval T.

The turn-on and turn-off drive signals are both provided by the drive stage 17 which includes transistor 20, diodes 21 and 22, inductor 23, and capacitor 24. The output current waveform of this drive stage is shown in FIG. 6. The transistor 20 is rendered alternatively conductive and nonconductive by a timing signal applied between its base and emitter electrodes by secondary winding 26 of a transformer. A current limiting resistor 25 is coupled between the base electrode of the transistor and one terminal of the secondary winding. The primary winding 27 of the transformer is coupled via terminals 28 and 29 to a sine wave oscillator (not shown) having a stable output frequency of 15.75 kh.

In normal operation, the transistor 20 is rendered conductive during the negative half-cycle of the timing signal. This half-cycle corresponds to the interval $t_6$–$t_5$ of FIG. 9. The base current $I_{B2}$ of transistor 20 is positive with respect to the reference direction shown in FIG. 1 and transistor 20 is conductive. This results in transistor 10 becoming conductive and the supply voltage $E_B$ is applied across inductor 23. As a result, the collector current of transistor 20, i.e., the base current of transistor 10, increases in a linear manner to a maximum of $I'_{PF}$. It shall be noted however that the collector current of transistor 20 becomes positive at time $t_1$ rather than at time $t_5$. The reasons therefore will be later explained. The collector current of transistor 20 increases to time $t_3$ whereupon the transistor is turned off and the current drops to essentially zero.

The transistor 20 does not turn off immediately at time $t_6$ when the timing signal causes the base current $I_{B2}$ to become negative since it contains stored minority carriers therein. These minority carriers are swept out during the interval $t_3$–$t_6$ of FIG. 9 wherein the base current $I_{B2}$ is negative. At time $t_3$, transistor 20 is nonconductive and its collector current, shown in FIG. 6, decreases rapidly from $I'_{PF}$ to zero in the switching interval $\tau'$.

When the transistor 20 is turned off at time $t_3$, the current $I_{L2}$ in inductor 23 is reversed in a resonant manner in an interval which is a function of the product of the inductance of inductor 23 and the capacitance of capacitor 24. The interval is shown in FIGS. 6 and 8 as $T'_R$ and is essentially equal to the interval $t_4-t_3$. The voltage across the inductor 23 is shown reversing its polarity during the interval $T'_R$ and tends to go more positive than the supply voltage $E_B$. However, when this occurs, the drive stage damping diode 22 begins to conduct the reverse base current $I_{B1}$ which has a magnitude $I'_{PR}$.

The reverse base current $I_{B1}$ is prevented, in the embodiment of FIG. 1, from flowing through the collector-base junction of transistor 20 and the transformer winding 26 to the base of drive stage transistor 10. In practice, diodes 21 and 22 are used to prevent the flow of current in the winding 26 which might affect the stability of the timing signal oscillator. However, in certain embodiments, diodes 21 and 22 may be eliminated and the collector-base junction of the drive stage transistor 10 utilized as the damping means. For both embodiments, the waveform of the drive stage output signal is shown in FIG. 6 wherein the reverse current flows through the drive stage damping means until time $t_1$ when the transistor 20 controls conduction.

The voltage at the base output stage transistor 10 is shown in FIG. 7. This voltage is less than supply voltage $E_B$ due ot the voltage drop across the emitter base junction of transistor 10 when the transistor is conducting. During the interval that transistor 10 is nonconductive, the voltage is greater than $E_B$ by the amount of the voltage drop across the damping means, either diode 22 or the collector-base junction of transistor 20, in the drive stage.

In operation, the drive stage transistor 20 causes the base current $I_{B1}$ to increase in a linear manner from zero to $I'_{PF}$ thereby maintaining output stage transistor 10 in saturation over essentially its entire dynamic conducting range. Transistor 20 is turned-off when its collector current reaches a magnitude $I'_{PF}$. However, transistor 10 continues to conduct during a retrace interval $T'_R$ of the drive stage due to the storage of minority carries therein. The current in the drive stage reverses to a magnitude $I'_{PR}$ at the end of interval $T'_R$ and is then applied to the base of transistor 10 as reverse base or turn-off drive. This turns transistor 10 off and initiates the retrace in the output stage. Since transistor 10 is conducting a large current during the interval $t_4-t_3$ in the absence of turn-on drive, it is desirable to insure that the transistor is driven well into saturation prior to time $t_3$ when transistor 20 is turned off. The amount of overdrive supplied to transistor 10 is determined by the current maximum $I'_{PF}$ which determines how long transistor 10 remains in saturation in the absence of the turn-on drive current. The turn-on and turn-off drive currents are determined in accordance with the following formula $$I'_{PF}+I'_{PR}\cong\frac{E_B}{L_1}T'$$

The turn-off drive current continues to flow after the collector current $Ic_1$ of transistor 10, shown in FIG. 3, decreases to zero due to the reverse breakdown of the base-emitter junction of transistor 10. This condition exists until the drive stage current reverses polarity and becomes positive whereupon transistor 10 is turned on. The drive stage current shown in FIG. 6 is noted to be positive in advance of the time when transistor 10 must be turned on, i.e. $I'_{PR}$ occurs prior to $I_{PR}$. This facilitates the transfer of the current from the damping diode 11 to transistor 10 without degrading the linearity of the sawtooth waveform.

Figure 10:
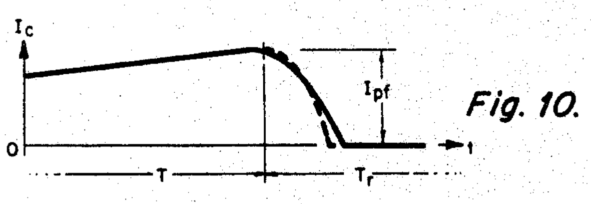
FIG. 10 shows comparative waveforms for different embodiments of the invention.

The description of the embodiment of FIG. 1 has been without reference to the inductor 15 coupled between the drive and output stages. The primary effect of the inductor 15 occurs during the turn-off of transistor 10 and is shown in FIG. 10 wherein the dashed curve corresponds to the inclusion of the inductor between the stages. FIG. 10 shows the improvement in turn-off time, i.e. steeper slope, for the collector current of transistor 10 resulting from the use of this inductor.

The values of the components and the performance parameters for one embodiment tested and operated in a color television receiver are set forth below.

| | | |
|---|---|---|
| Peak-to-peak current ($I_{PF}+I_{PR}$) | a | 6 |
| Deflection coil inductance $L_I$ | μh | 200 |
| Active trace interval T | μs | ≅50 |
| Retrace interval $T_R$ | μs | 12 |
| Turn-off time of transistor **10** | μs | 1 |
| Supply voltage $E_B$ | v | 24 |
| Peak collector-base voltage of transistor **10** | v | 175 |
| Inductors: | | |
| **15** | μh | 18 |
| **23** | mh | 1.4 |
| $I'_{B\ peak}$ | ma | ≅15 |
| Approximate power consumption | watts | 7 |
| Transistors **10** and **20** | | Type RCA 2N3731 |
| Diodes: | | |
| **11** | | Type RCA 1N4785 |
| **21** and **22** | | Type SR500 |

While the above description has referred to a specific embodiment of the invention, it will be apparent that many modifications and variations may be made therein without departing from the spirit and scope of the invention.

What is claimed is:

1. A circuit for generating a sawtooth scan signal in a horizontal deflection coil in accordance with a timing signal, which comprises:

(a) a first semiconductor element having first, second and third electrodes, said first electrode being maintained at a supply voltage level, said element passing current flowing from said first to third electrodes when rendered conductive by the application of a first polarity signal to said second electrode, said element being rendered nonconductive by the application of a second polarity signal to said second electrode, said third electrode being coupled to the first terminal of the deflection coil, the second terminal of said coil being coupled to a reference potential;

(b) a first diode having first and second electrodes, said diode being poled to pass current flowing from said first to said second electrodes, said first electrode being coupled to the third electrode of said first element, said second electrode being coupled to the first electrode of said first element;

(c) first capacitive means having first and second terminals, said first terminal being coupled to the first terminal of said coil, said second terminal being coupled to the reference potential;

(d) means for applying a sawtooth shaped drive signal to the second electrode of said first element, said drive signal having an initial magnitude at the second polarity and a final magnitude at the first polarity, said initial and final magnitudes being substantially equal, said drive signal rendering said first element alternately conductive and nonconductive; and (e) means for applying a timing signal to said means for applying the drive signal.

2. The circuit in accordance with claim 1 wherein said means for applying a sawtooth drive signal to the second electrode of said first element comprises:

(a) a second semiconductor element having first, second and third electrodes, said first electrode being coupled to the second electrode of said first element, said element passing current bowing from said first to third electrodes when rendered conductive by the application of a first polarity signal to said second electrode, said element being rendered nonconductive by the application of a second polarity signal to said second electrode;

(b) inductive means having first and second terminals, said first terminal being coupled to the third electrode of said second element, said second terminal being coupled to the reference potential;

(c) second capacitive means having first and second terminals, said first terminal being coupled to the first terminal of said second inductive means, said second terminal being coupled to the reference potential; and wherein said means for applying a timing signal is coupled between the first and second electrodes of said second element, said timing signal driving said second element into conduction whereby said second element is rendered conductive by the application of a sawtooth signal to the second electrode thereof, said timing signal rendering said second element alternately nonconductive whereby a second polarity signal is applied to the second electrode of said first element thereby rendering said first element nonconductive.

3. The circuit in accordance with claim 2 wherein said means for applying a timing signal to the second electrode of said second element comprises a transformer having primary and secondary windings, said primary winding being coupled to a timing signal generator, said secondary winding being coupled between the first and second electrodes of said second element.

4. The circuit in accordance with claim 3 further comprising a second diode having first and second electrodes, said diode being poled to pass current flowing from said first to second electrodes, said first electrode being coupled to the first terminal of said inductive means, said second terminal being coupled to the first electrode of said second element.

5. The circuit in accordance with claim 4 further comprising a third diode having first and second electrodes, said diode being poled to pass current flowing from said first to second electrodes, said first electrode being coupled to the third electrode of said second element, said second electrode being coupled to the first terminal of said inductive means.

6. The circuit in accordance with claim 5 wherein said first and second elements are transistors.

7. The circuit in accordance with claim 6 further comprising second inductive means having first and second terminals, said first terminal being coupled to the first electrode of said second element, said second terminal being coupled to the second electrode of said first element.

8. A circuit for generating a sawtooth scan signal in a horizontal deflection coil in accordance with a timing signal, which comprises:

(a) a first transistor having emitter, base, and collector electrodes, said collector electrode being coupled to said deflection coil, said first electrode being coupled to a voltage source;

(b) damping means having first and second terminals, said first terminal being coupled to the collector electrode of said first transistor, said second electrode being coupled to the emitter electrode of said first transistor;

(c) flyback capacitor means having first and second terminals, said first terminal being coupled to the collector electrode of said first transistor, said first terminal being coupled to a reference potential;

(d) a second transistor having emitter, base and collector electrodes, said emitter electrode being coupled to the base electrode of said second transistor;

(e) inductive means having first and second terminals, said first terminal being coupled to the collector electrode of said second transistor, said second terminal being coupled to the reference potential;

(f) second flyback capacitor means having first and second terminals, said first terminal being coupled to the first terminal of said inductive means, said second terminal being coupled to the reference potential; and (g) means for applying a timing signal to the base electrode of said second transistor, said means being coupled between the emitter and base electrodes of said second transistor, said second transistor being alternately rendered conductive and nonconductive by the applied timing signal, said first transistor being driven into conduction when said second transistor is driven into conduction and driven out of conduction by a reverse current from said second flyback capacitor means.

9. The circuit in accordance with claim 8 wherein said means for applying a timing signal to the base electrode of said second transistor comprises a transformer having primary and secondary windings, said primary winding being coupled to a timing signal generator, said secondary winding being coupled between the base and emitter electrodes of said second transistor.

10. The circuit in accordance with claim 9 further comprising a first diode having first and second electrodes, said diode being poled to pass current flowing from said first to second electrodes, said first electrode being coupled to the first terminal of said inductive means, said second terminal being coupled to the collector electrode of said second transistor.

11. The circuit in accordance with claim 10 further comprising a second diode having first and second electrodes, said diode being poled to pass current flowing from said first to second electrodes, said first electrode being coupled to the collector electrode of said second transistor, said second electrode being coupled to the first terminal of said inductive means.

References Cited

UNITED STATES PATENTS 3,366,807 1/1968 Heffron ------------- 315—27

RODNEY D. BENNETT, Jr., Primary Examiner

JOSEPH G. BAXTER, Assistant Examiner

PO-1050
(5/69)

UNITED STATES PATENT OFFICE
CERTIFICATE OF CORRECTION

Patent No. 3,466,496 Dated Sept. 9, 1969

Inventor(s) William Geller and Kurt Hillman

It is certified that error appears in the above-identified patent and that said Letters Patent are hereby corrected as shown below:

Column 9, line 12, delete "second" and insert --first--

SIGNED AND
SEALED
DEC 1, 1970

(SEAL)
Attest:

Edward M. Fletcher, Jr.
Attesting Officer

WILLIAM E. SCHUYLER, JR.
Commissioner of Patents